US007463944B2

(12) United States Patent
Schaeffer

(10) Patent No.: US 7,463,944 B2
(45) Date of Patent: Dec. 9, 2008

(54) METHOD OF GROOVING AND DRILLING AN OPHTHALMIC LENS BLANK, MACHINE PROGRAMMED THEREFOR, AND COMPUTER PROGRAM

(75) Inventor: Kurt William Schaeffer, Waynesboro, VA (US)

(73) Assignee: National Optronics, Charlottesville, VA (US)

( * ) Notice: Subject to any disclaimer, the term of this patent is extended or adjusted under 35 U.S.C. 154(b) by 0 days.

(21) Appl. No.: 11/511,431

(22) Filed: Aug. 29, 2006

(65) Prior Publication Data

US 2008/0065255 A1 Mar. 13, 2008

(51) Int. Cl.
*G06F 19/00* (2006.01)

(52) U.S. Cl. ........................... 700/164; 700/159; 451/5; 451/43

(58) Field of Classification Search ................. 700/160, 700/164, 172, 186, 159; 351/159, 177; 451/5, 451/42–44, 240
See application file for complete search history.

(56) References Cited

U.S. PATENT DOCUMENTS

| | | | | |
|---|---|---|---|---|
| 5,410,843 | A * | 5/1995 | Gottschald | 451/43 |
| 6,547,642 | B2 * | 4/2003 | Hatano | 451/11 |
| 6,942,542 | B2 * | 9/2005 | Shibata | 451/5 |
| 6,980,881 | B2 * | 12/2005 | Greenwood et al. | 700/193 |
| 2007/0099543 | A1 * | 5/2007 | Belli et al. | 451/5 |

* cited by examiner

*Primary Examiner*—Alexander J Kosowski
(74) *Attorney, Agent, or Firm*—Berenato, White & Stavish, LLC

(57) ABSTRACT

The present invention is directed to a method of controlling an edger device, and a machine programmed to edge a lens blank. A lens blank and an edger are provided. The edger device is capable of forming a groove in a peripheral edge of the lens, and forming at least one hole extending from a first major surface of the lens to a second major surface. A CPU is provided, which is operably associated with the edger device for controlling operation of the edger device. Processing instructions are transmitted from the central processing unit to the edger device. The processing instructions comprise: forming a groove in a peripheral edge of a lens blank; and forming at least one hole in the lens blank extending from the first major surface to the second major surface.

20 Claims, 2 Drawing Sheets

METHOD OF GROOVING AND DRILLING AN OPHTHALMIC LENS BLANK, MACHINE PROGRAMMED THEREFOR, AND COMPUTER PROGRAM

COMPUTER PROGRAM LISTING APPENDIX

A computer program listing appendix is submitted herewith on compact disc recordable (CD-R) as Appendix A, and the material thereon is incorporated herein by reference. Duplicate copies of Appendix A are provided as Copy 1 and Copy 2. Copy 1 and Copy 2 are identical.

The files contained on Copies 1 and 2 are as follows:

| File Name: | Size in Bytes: | Date of Creation: |
|---|---|---|
| calc.c. | 9,984 | 24 Aug. 2005 |

FIELD OF THE INVENTION

The present invention is directed to a method of controlling an edger device, and a machine programmed to edge a lens blank. A lens blank and an edger are provided. The edger device is capable of forming a groove in a peripheral edge of the lens, and forming at least one hole extending from a first major surface of the lens to a second major surface. A CPU is provided, which is operably associated with the edger device for controlling operation of the edger device. Processing instructions are transmitted from the central processing unit to the edger device. The processing instructions comprise: forming a groove in a peripheral edge of a lens blank; and forming at least one hole in the lens blank extending from the first major surface to the second major surface.

BACKGROUND OF THE INVENTION

Prescription eyeglass lenses are curved in such a way that light is correctly focused onto the retina of a patient's eye, improving vision. Such lenses are formed from glass or plastic lens "blanks" having certain desired properties to provide the correct prescription for the patient. The blanks are usually circular and of substantially larger dimension compared to the relatively smaller finished lenses assembled into eyeglass frames. Therefore, a lens blank must be edged to fit an eyeglass frame selected by the patient.

Ophthalmic laboratory technicians cut, grind, edge, and polish blanks according to prescriptions provided by dispensing opticians, optometrists, or ophthalmologists. The specifications include the patient's full prescription, including: 1) the total power the finished lens must have; 2) the strength and size of any segments, if needed (i.e. multifocal lenses); 3) the power and orientation of any cylinder curves; and 4) the location of the optical center and any inducted prism that may be needed.

In addition, the large diameter blank is sized and shaped to fit into the frame selected by the patient. The lens blank may be shaped using an edger, such as the edger disclosed in U.S. Pat. No. 6,203,409 to Kennedy et al., the disclosure of which is incorporated herein by reference. The blank is edged so that the periphery of the finished lenses fit into the openings on the frames.

Edging of a lens blank typically requires the application of a block to a surface thereof. The block is releasably secured to a clamp assembly, so that rotation of the clamp assembly causes corresponding rotation of the lens blank. As the blank is rotated, the periphery of the blank may be cut to a desired size using a router tool. The blank may be either ground or cut. Wet edgers use diamond-impregnated wheels with different abrasive grits to grind the lens material. A coolant is sprayed on the wheels during edging to reduce heat. Dry edgers use carbide steel or diamond blades mounted on the spindle of a motor to shave the lens. The lens periphery may also be polished using a polishing tool. some edgers are also able to form a groove about the periphery of the lens.

The finished lens may then be assembled with the selected eyeglass frames. Many frames have a bevel extending around the inner circumference of the openings. The bevel interlocks with a complementarily shaped groove formed about the peripheral edge of the lens. The interlock between the complementary bevel and groove helps to secure the lens within the frame opening.

In order to improve efficiency, some edgers use CNC (Computer Numeric Control) technology whereby a computer controls the lens processing equipment by following encoded commands. The commands are based on information from frame tracings or internal lens probes and the user. Information relating to the size and shape of the lens needed for a particular frame (i.e. trace data) may be generated, and subsequently transmitted to the edger. The trace data may be stored in a control system, such as a central processing unit, in communication with the edger.

Some lenses require that the lens have a groove in the peripheral edge of the lens, and also contain drill features in the surface of the lens. For example, some frame assemblies require that one or more holes be drilled in the lenses, particularly lenses to be used in rimless style frames. Several factors to consider when determining the hole position include the horizontal and vertical coordinates, lens base curve, wrap angle, and the mounting's pantoscopic tilt. Hand drilling is used by some laboratories. Other laboratories use a drill press.

Conventional drilling devices include a computer program and control system separate from the control system for edging and grooving the blank. Thus, a lens blank must first be edged and grooved, and then separately drilled to produce the desired lens, thereby increasing manufacturing time and cost.

SUMMARY OF THE INVENTION

The present invention is directed to a method of controlling an edger device. A lens blank and an edger are provided. The edger device is capable of forming a groove in a peripheral edge of the lens blank, and forming at least one hole extending from a first major surface of the lens blank to a second major surface. A CPU is provided, which is operably associated with the edger device for controlling operation of the edger device. Processing instructions are transmitted from the central processing unit to the edger device. The processing instructions comprise: forming a groove in a peripheral edge of a lens blank; and forming at least one hole in the lens blank extending from the first major surface to the second major surface.

A machine programmed to edge a lens blank is also disclosed. The machine includes an edger device for forming a groove in the peripheral edge of a lens blank and for drilling one or more holes through the lens blank, and a central processing unit operably associated with the edger device for controlling operation thereof. A computer program is stored on a medium in communication with the central processing unit. The computer program comprises: a first instruction set operably causing the edger device to form a groove in a peripheral edge of a lens blank; and a second instruction set operably causing the edger device to drill a hole in the lens blank.

The present invention also relates to a computer program stored on a medium for use in an edging process employing a lens blank and an edger device. The computer program comprises: a first set of computer instructions operably recalling trace data about a lens blank to be processed; a second set of computer instructions operably causing an edger device to form a groove in a peripheral edge of the lens blank at a selected position defined by and relative to the trace data; and a third set of computer instructions operably causing the edger device to drill a hole through the lens blank.

DETAILED DESCRIPTION OF THE INVENTION

Figure 1:
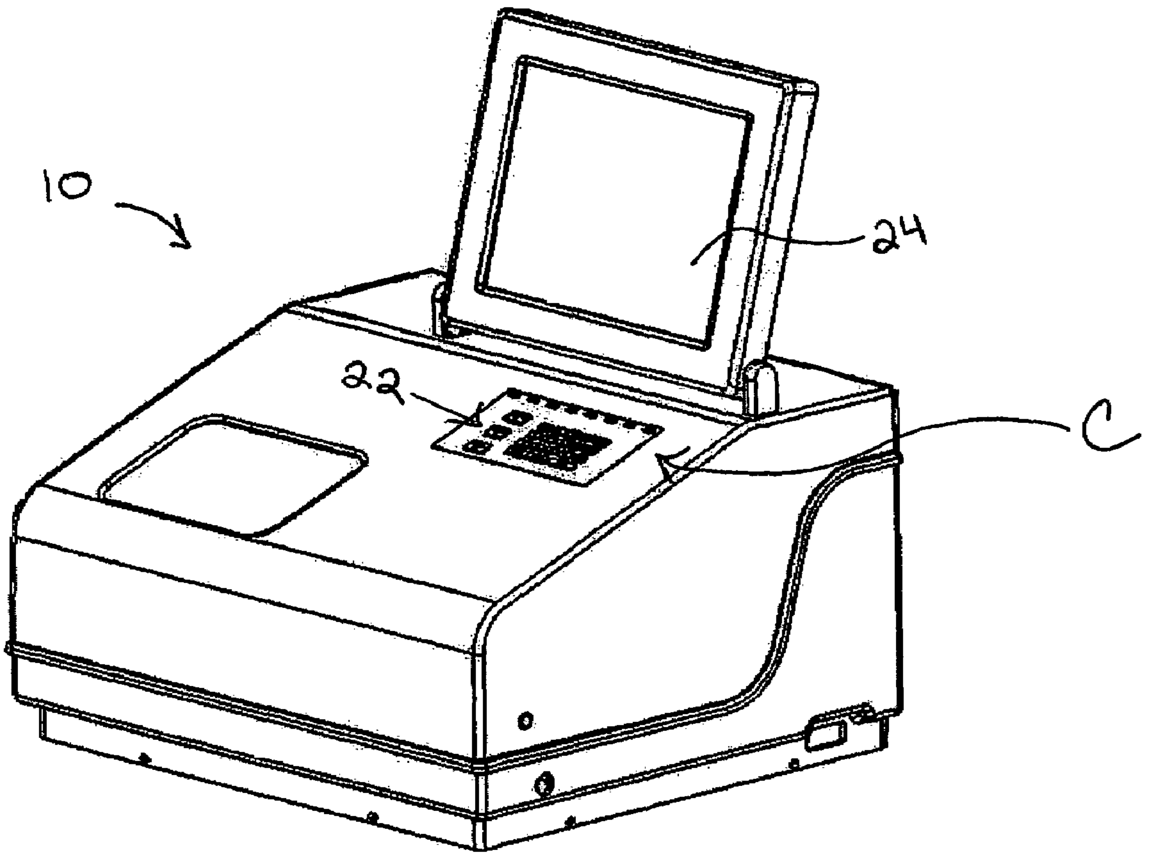
FIG. 1 is a perspective view of an edger device for use in an edging process according to the present invention.
Figure 2:
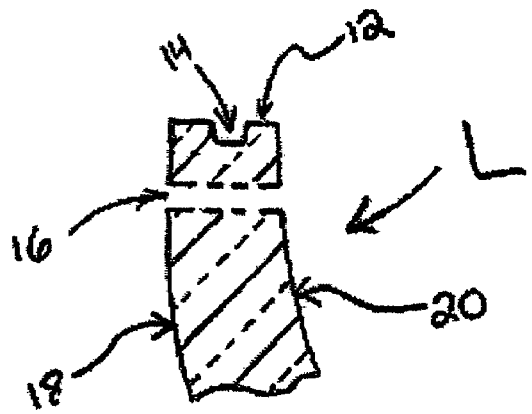
FIG. 2 is a fragmentary sectional view of an ophthalmic lens blank having a groove formed in a peripheral edge, and a hole extending through the lens blank.

The present invention is directed to a machine programmed to edge a lens blank. As known in the art, a lens blank may be ground to fit a particular eyeglass frame. As best shown in FIGS. 1 and 2, the machine may be an automated edger device 10, which is capable of grinding a peripheral edge 12 of lens blank L to a desired size and shape, forming a groove 14 in peripheral edge 12 of lens blank L, and drilling one or more holes 16 in lens blank L, extending from a first major surface 18 of lens blank L to an opposite second major surface 20, as shown in FIG. 2.

Suitable edger devices are available from National Optronics of Charlottesville, Va., such as the 7E Patternless Edger machine. Edger device 10 may include a router tool for processing the lens blank, such as a combination grooving and drilling router tool as described in U.S. Pat. No. 7,029,378, the disclosure of which is incorporated herein by reference. Alternatively, edger device 10 may include a grooving wheel, as known in the art, having a cutting edge for forming the groove, as well as a drill tool having a blade for drilling the hole(s).

A central processing unit, or "CPU", (not shown) is provided, preferably as an internal component of edger device 10. However, the CPU may also be external to edger device 10. The CPU is operably associated with edger device 10 and controls operation thereof. The CPU includes a storage medium. A computer program is stored on the medium and in communication with the CPU. The computer program includes a set of processing instructions for controlling operation of edger device 10. The CPU transmits the processing instructions to edger device 10, thereby controlling the edging process according to specified processing steps.

A technician may select processing parameters based on trace data for a particular lens blank L to be processed. Trace data is input to the CPU to ensure proper formation of groove 14 and hole(s) 16, including the horizontal and vertical coordinates, lens base curve, frame wrap, and other data relating to the optical and geometrical parameters of the finished lens.

As shown in FIG. 1, edger device 10 preferably includes a control panel C mounted to an upper portion of edger device 10 and provides access by the technician to various controls, collectively 22. Processing parameters may be input into edger device 10 via controls 22, including the position of groove 14 in peripheral edge 12 and the depth of groove 14 relative to peripheral edge 12. In addition, processing parameters of one or more holes 16 may be input into edger device 10, including the size, shape, and location of hole 16.

Controls 22 may be provided as a touch screen including a plurality of touch keys and input fields displayed thereon. Alternatively, a conventional keypad or other input device may be provided. Alternatively, an external input device operably associated with edger 10 may be provided, such as a tablet or keypad. Edger device 10 may also include a display 24 for displaying input fields, trace data, and other information corresponding to the selected processing parameters. As shown in FIG. 1, display screen 24 is an LCD display screen mounted on an upper portion of edger device 10. However, an external display operably associated with edger device 10 may be provided.

In addition to processing parameters relating to groove 14 and hole(s) 16, other processing parameters may be selected by the technician, such as wet and/or dry polishing, bevel type, etc. For example, the touch screen may include an input field for "polish" with the technician prompted to an input field in which "yes" or "no" may be selected. With respect to processing parameters for groove 14, an input field may be provided wherein the technician specifies its position about peripheral edge 12 and its depth. Input fields for hole(s) may include width, location and number. Hole(s) 16 may be located and drilled based upon their location relative to peripheral edge 12 (for example, up 10 mm from the geometric center, and in 5 mm from a corresponding edge). Thus, input fields may prompt the technician to enter numerical data corresponding to hole location. A second hole 16 may also be located and drilled based upon its location relative to the first drilled hole (for example, 2 mm in and 2 mm down from the first drilled hole 16), with input fields corresponding thereto. As such, controls 22 may include various input fields in addition to processing parameters for groove 14 and hole(s) 16. Further, such input fields and the selected processing parameters may be displayed on display 24.

While trace data may be manually entered via controls 22, such data may also be downloaded to the CPU via an associated serial port, particularly if such data is electronically available from the frame manufacturer. Such data is sometimes accessible by the frame manufacturer's model number and size information, and may be easily downloaded to the CPU. Trace data may be stored on the associated storage medium and recalled by the CPU when needed. Accordingly, the technician may request particular stored or downloaded trace data via an associated input field with controls 22.

Figure 3:
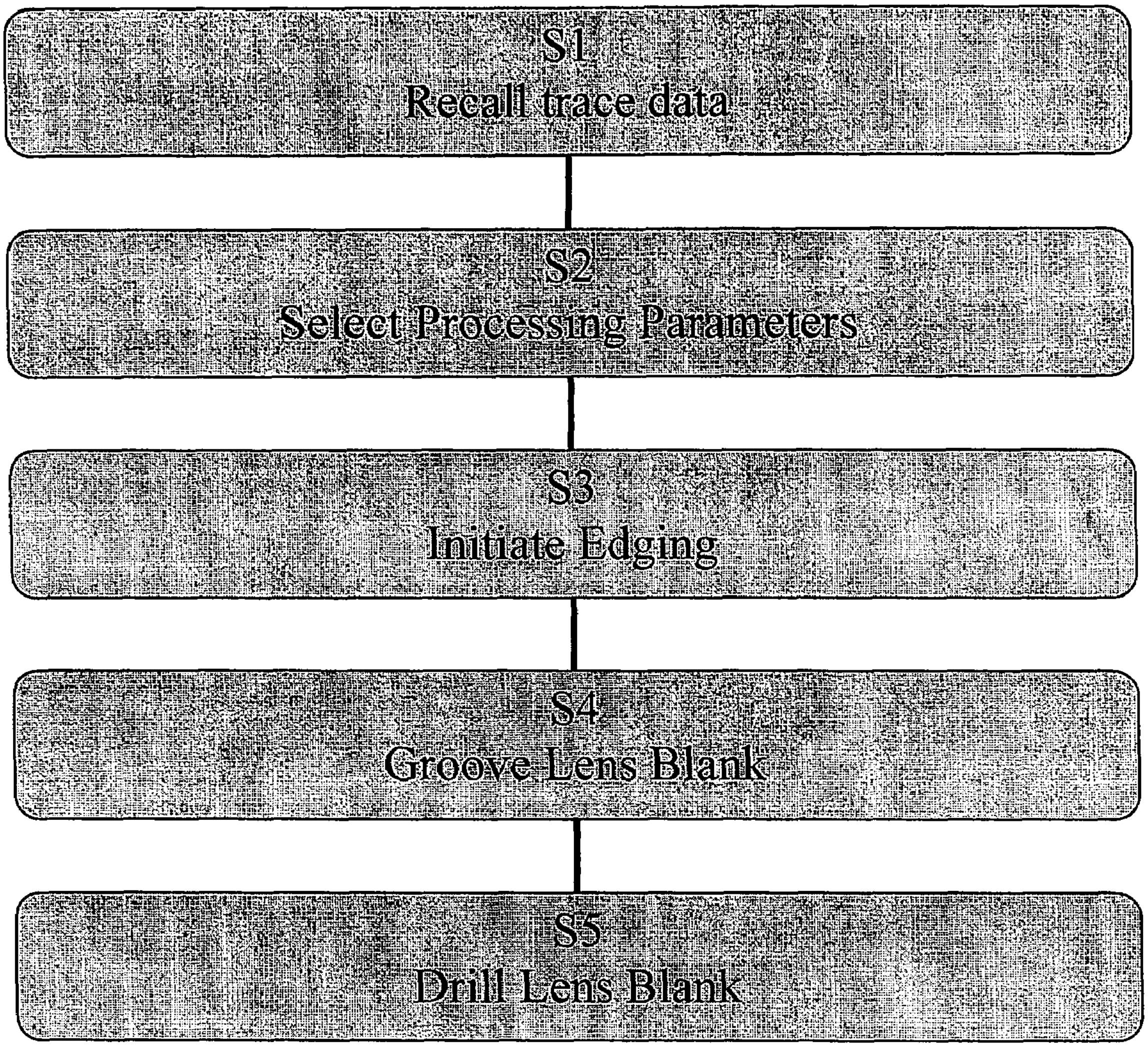
FIG. 3 is a chart showing processing steps for an edging process according to the present invention.

Processing steps of the processing instructions will be described with reference to FIG. 3. First, the CPU recalls trace data usable by edger device 10 and corresponding to particular frames at S1. Trace data typically includes a list of points that define the shape of the lens and matching frame. Such points may be relative to a geometric or optical center of lens blank L. Trace data is typically available from the frame manufacturer, and may be downloaded to the CPU via an associated serial port.

Then, processing parameters relating to groove 14 and hole(s) 16 may be selected by the technician and input into edger device 10 via controls 22 at S2. The position, depth, and width of groove 14 may be selected by the technician. For example, the front to back placement of groove 14 in peripheral edge 12 may be selected by the technician. Groove 14 may be centered on peripheral edge 12, closer to the front of lens blank L, or closer to the back of lens blank L, or any position therebetween. Additionally, the position of groove 14 on peripheral edge 12 may vary depending on its location around lens blank L. For example, groove 14 may be closer to the front of lens blank L at one point, and closer to the back of lens blank L at another point. In addition, the position, width, and number of holes 16 may be selected by the technician at S2. The desired parameters of groove 14 and hole(s) 16 may also be downloaded to the CPU, if such information is available.

The CPU then transmits an instruction set for initiating the edging process at S3, causing edger device 10 to grind peripheral edge 12 of lens blank L to a desired size and shape according to the recalled trace data. Preferably, lens blank L is edged to a size slightly larger than the desired final size of the resulting lens if additional lens blank material will be removed from peripheral edge 12 when forming groove 14. Additional grinding of peripheral edge 12 may also occur if an additional "clean finish" step is employed, wherein any debris that accumulates in groove 14 is removed with the associated router or grooving wheel during a final pass about peripheral edge 12. The clean finish step for removing lens material debris from groove 14 is described more fully in applicant's co-pending application titled "Method Of Controlling An Edger Device, Machine Programmed To Edge An Ophthalmic Lens Blank, And Computer Program", the disclosure of which is incorporated herein by referenced. As such, the edging process at S3 should account for any additional grinding of peripheral edge in subsequent processing steps.

Then, an instruction set causes edger device 10 to form groove 14 at a predetermined position and depth in peripheral edge 12 of lens blank L at S4. Groove 14 is formed at a position about peripheral edge 12 according to the selected (or downloaded) parameters at S2. The depth of groove 14 is typically consistent around the entire peripheral edge 12, and may be set by a configuration or set-up value on edger device 10. Groove 14 is formed to the proper depth and position in light of the shape of resulting lens, which is known from the trace data. Thus, groove 14 is formed based upon both the selected (or downloaded) parameters at S2 as well as the recalled trace data at S1.

After groove 14 has been formed, an instruction set causes edger device 10 to drill one or more holes 16 at S5 extending from first major surface 18 to second major surface 20, as specified by the selected (or downloaded) processing parameters at S2. A first hole 16 is drilled into lens blank L at a selected position spaced from peripheral edge 12. The trace data does not contain any information relating to where hole(s) 16 are to be drilled. However, the shape of resulting lens, and therefore position of peripheral edge 12, is known from the trace data. The CPU locates and drills the first hole 16 at the selected position based on the position of peripheral edge 12, which is known from the trace data. As such, the position of the first hole 16 is determined based on the selected position at S2, which is relative to and defined by the shape of resulting lens as known from recalled trace data at S1.

The position of a second hole 16, or any number of subsequent holes 16, may be determined based on the position of the peripheral edge 12 as known from the trace data, as explained above. Alternatively, the position of a second or subsequent hole(s) 16 may be located and drilled based on the position of the previously drilled hole 16. For example, the position of a second hole 16 is keyed off of the location of the first drilled hole 16, the position of a third hole 16 is keyed off of the location of the second drilled hole 16, the position of a fourth hole 16 is keyed off of the location of the third drilled hole 16, and so forth. The resulting lens blank L is edged, grooved and drilled according to the selected parameters at S2, in light of the shape of the lens blank L as known from trace data at S1, in a single control step.

The present invention also relates to a computer program stored on a medium for use in an edging process employing a lens blank and an edger device, such as edger device 10. The computer program includes a first set of computer instructions recalling trace data for the lens blank to be processed. A second set of computer instructions causes edger device 10 to form groove 14 in peripheral edge 12 of the lens blank at a selected position defined by and relative to the trace data. A third set of computer instructions causes edger device 10 to drill one or more holes 16 through the lens blank. The groove is formed at the selected position in peripheral edge 12, and with a predetermined width and depth, based on selected processing parameters defined by and relative to the recalled trace data. In addition, position and width of holes are drilled based on selected processing parameters defined by and relative to the recalled trace data.

Thus, the disclosed computer program and method allow for a lens blank to be edged, grooved and drilled in a single control system, and thus in a single cycle. An edger device controlled by the disclosed software algorithm will first execute an edging process, adding a groove to the lens blank. Then, the software directs the edger to cut the requested drill features into the lens, producing the lens for the technician in an integrated operation.

An exemplary computer routine for the disclosed computer program is provided in computer program listing Appendix A. However, it would be readily understood that other computer routines may be applied to achieve the disclosed method. Thus, it will be apparent to one of ordinary skill in the art that various modifications and variations can be made to the disclosed invention without departing from the spirit of the invention. Therefore, it is intended that the present invention include all such modifications or variations, provided they come within the scope of the following claims and their equivalents.

I claim:

1. A method of controlling an edger device, comprising the steps of:

providing a lens blank having first and second opposite major surfaces and a peripheral edge there between;

providing an edger device for forming a groove in the peripheral edge, and for forming at least one hole extending from the first major surface to the second major surface;

providing a central processing unit operably associated with the edger device for controlling operation of the edger device; and transmitting processing instructions from the central processing unit to the edger device, wherein the processing instructions comprise:

a) forming a groove in a peripheral edge of a lens blank; and b) forming at least one hole in the lens blank extending from the first major surface to the second major surface, wherein said steps of forming a groove and forming at least one hole are transmitted in a single cycle.

2. The method of claim 1, wherein multiple holes are formed during said step of forming at least one hole, wherein a position of each successive one of said multiple holes is determined by and relative to a position of a previously formed hole.

3. The method of claim 1, including the further step of selecting a position of the groove prior to said transmitting step.

4. The method of claim 1, including the further step of selecting a position of the at least one hole prior to said transmitting step.

5. The method of claim 1, including the further step of selecting a depth of the groove prior to said transmitting step.

6. The method of claim 1, including the further step of selecting a width of the at least one hole prior to said transmitting step.

7. The method of claim 1, including the further steps of:

recalling trace data about the lens to be processed prior to said transmitting step; and selecting a position in the peripheral edge for forming the groove, wherein the groove is formed at the selected position which is relative to and determined by the recalled trace data.

8. The method of claim 1, including the further steps of:

recalling trace data about the lens to be processed prior to said transmitting step; and selecting a position spaced from the peripheral edge for forming the at least one hole, wherein the at least one hole is formed at the selected position which is relative to and determined by the recalled trace data.

9. A machine programmed to edge a lens blank, comprising:

an edger device for forming a groove in the peripheral edge of a lens blank, and for drilling through the lens blank;

a central processing unit operably associated with the edger device for controlling operation of the edger device; and a computer program stored on a medium in communication with said central processing unit, said computer program comprising:

a) a first instruction set operably causing said edger device to form a groove in a peripheral edge of a lens blank; and b) a second instruction set operably causing said edger device to drill a hole in the lens blank, wherein said first and second instruction sets cause said edger device to form the groove and to drill the hole in a single cycle.

10. The machine of claim 9, wherein said edger device includes a router tool having a grooving wheel having a cutting edge for forming the groove and a drill blade for drilling the hole.

11. The machine of claim 9, wherein said edger device includes a first router tool having a grooving blade for forming the groove, and a second router tool having a drill blade for drilling the hole.

12. The machine of claim 9, wherein said edger device includes a grooving wheel having a cutting edge for forming the groove, and said edger device having a drill having a blade for drilling the hole.

13. The machine of claim 9, further comprising trace data stored on the medium and in communication with said central processing unit, said trace data defining a shape of the peripheral edge of the lens blank, said second instruction set operably causing said edger device to drill the hole at a selected position defined by and relative to the trace data.

14. The machine of claim 13, further comprising an input device operably associated with said central processing unit, wherein said selected position is input via said input device.

15. The machine of claim 13, wherein said second instruction set operably causes said edger device to drill multiple holes based on said selected position, wherein a position of each successive one of said multiple holes is determined by and relative to a position of a previously formed hole.

16. The machine of claim 9, further comprising trace data stored on the medium and in communication with said central processing unit, said trace data defining a shape of the peripheral edge of the lens blank, said first instruction set operably causing said edger device to form the groove at a selected position defined by and relative to the trace data.

17. The machine of claim 16, further comprising an input device operably associated with said central processing unit, wherein said selected position is input via said input device.

18. A computer program stored on a medium for use in an edging process employing a lens blank and an edger device, the computer program comprising:

a first set of computer instructions operably recalling trace data about a lens blank to be processed;

a second set of computer instructions operably causing an edger device to form a groove in a peripheral edge of the lens blank at a selected position defined by and relative to the trace data;

a third set of computer instructions operably causing the edger device to drill a first hole through the lens blank; and a fourth set of computer instructions operably causing the edger device to drill a second hole through the lens blank, wherein a position of the second hole is determined by and relative to a position of the previously formed first hole.

19. The computer program of claim 18, wherein the selected position is variable.

20. The computer program of claim 18, wherein said third set of computer instructions operably causes said edger device to drill the hole at a selected position defined by and relative to the trace data.

* * * * *